US009055766B2

(12) United States Patent  
de Groot et al.

(10) Patent No.: US 9,055,766 B2  
(45) Date of Patent: Jun. 16, 2015

(54) SYSTEMS AND METHODS FOR FLORETING BROCCOLI

(75) Inventors: Peter de Groot, Carmel, CA (US); Jason Tracy, Salinas, CA (US); Albert Norman, Salinas, CA (US)

(73) Assignee: MANN PACKING CO., INC., Salinas, CA (US)

( * ) Notice: Subject to any disclaimer, the term of this patent is extended or adjusted under 35 U.S.C. 154(b) by 825 days.

(21) Appl. No.: 12/986,072

(22) Filed: Jan. 6, 2011

(65) Prior Publication Data

US 2012/0174802 A1    Jul. 12, 2012

(51) Int. Cl.  
*A23N 15/00*    (2006.01)

(52) U.S. Cl.  
CPC ..................................... *A23N 15/003* (2013.01)

(58) Field of Classification Search  
USPC .............. 99/546, 635, 636, 637, 643; 83/367, 83/733, 932  
See application file for complete search history.

(56) References Cited

U.S. PATENT DOCUMENTS

| | | | | |
|---|---|---|---|---|
| 3,252,491 A | * | 5/1966 | Wooldridge | .................... 99/643 |
| 3,908,813 A | * | 9/1975 | Bertonelli | .................. 198/470.1 |
| 4,041,672 A | * | 8/1977 | Gularte | ........................... 53/399 |
| 4,658,714 A | * | 4/1987 | McIlvain et al. | ................. 99/637 |
| 4,773,324 A | * | 9/1988 | Wylie et al. | ...................... 99/638 |
| 5,009,909 A | * | 4/1991 | Hirtle et al. | ..................... 426/481 |
| 5,168,801 A | * | 12/1992 | Switek, Jr. | ...................... 99/546 |
| 5,277,107 A | * | 1/1994 | Turatti | ............................ 99/638 |
| 5,470,602 A | * | 11/1995 | Cecil | ............................. 426/481 |
| 2004/0129150 A1 | * | 7/2004 | Lancaster et al. | ............... 99/486 |
| 2009/0114105 A1 | * | 5/2009 | Comin Escartin | .............. 99/637 |
| 2009/0165433 A1 | * | 7/2009 | Jauncey et al. | ................ 56/14.5 |
| 2009/0208626 A1 | * | 8/2009 | Jarrard et al. | ................. 426/518 |

* cited by examiner

*Primary Examiner* — Dana Ross  
*Assistant Examiner* — James Sims, III  
(74) *Attorney, Agent, or Firm* — Leydig, Voit & Mayer, LLP; Gerald T. Gray

(57) ABSTRACT

Broccoli heads are placed individually, with the stem down or laying horizontal, in a receiving cup in a loading position. A gripping mechanism engages the stem portion to secure the head in place. A positioning and cutting assembly adjusts the position of the receiving cup to a cutting position with the head down and stem up and rotates the receiving cup. The assembly includes a cutting mechanism having a blade that engages the rotating head to cut the florets. The blade cuts off the florets which fall to a first location where they are collected in a first collecting bin or by a first collection conveyor. The assembly next adjusts the receiving cup to a releasing position, whereupon the clamping mechanism disengages to release the stem, which falls to a second location where it is collected on a second collecting conveyor or in a second collecting bin. The assembly then returns the receiving cup to the loading position.

16 Claims, 11 Drawing Sheets

Small Head

Medium Head

Large Diameter Head

Medium Diameter Head

Small Diameter Head

SYSTEMS AND METHODS FOR FLORETING BROCCOLI

CROSS-REFERENCES TO RELATED APPLICATIONS

N/A

BACKGROUND

The present invention relates generally to methods and devices for floreting broccoli, and more particularly to systems and methods for automatically dissecting broccoli heads into florets and stems.

Various methods and machines that are directed to a broccoli floreting processes and apparatus are well known in the art. Cutting broccoli heads by hand with an ordinary cutting device is an easily available and flexible method to floret broccoli heads. However, these manual processes are disadvantageous because they are time consuming processes that require high amounts of manpower. Different mechanical procedures speed up the processing time through the use of automated and semi-automated machines. These machines cut the broccoli in ways which causes instability and, therefore yields less efficient cutting results. It is desirable to achieve a more consistent floret length from the floreting process. Previous automated and semi-automated broccoli floreting machines yield broccoli heads of varying floret length. Consequently, such dimensional variance results in vast amounts of scrap because the changes in broccoli head dimensions does not allow for consistent cutting locations between the broccoli head elements and the automated machine cutting implements.

Another approach known in the art uses two cutting blades that cut the broccoli from both sides to attempt to address these shortcomings. However, the constant clashing of the blades in their contact point entails apace abrasion and inaccurate cuts. Also, the constant clashing of the blades leads to higher maintenance costs of replacement parts and greater machine downtime.

Another well known process is a core removal device that features two blades folding up. The blades are affixed on a sliding support that moves perpendicular to a conveyor means layer and is equipped with an adjustable regulator that allows vertical tuning as well as offset modulation. However, this approach does not allow the dimensional consistency to eliminate scrap and further exhibits many of the machine downtime drawbacks previously discussed.

Another similar process is a device that features pivotably mounted blades for cutting movement in which the cutting edges follow an accurate path to achieve a complete removal of the stem. These blades are also connected together and are formed with cutting edges which open and close in the manner of a beak. The cutter elements are mounted on a carrier plate which is pivotable between the cutting and core discharge positions about a pivot axis to one side of and parallel with a conveyor means. It misses however any further means for fixture.

A broccoli head trimming apparatus variably and shakily holding the heads by an inflatable elastomeric collar that transports the broccoli on a conveyor means was also developed for bulk processing of broccoli heads. When the broccoli head approaches the trimming station the machine's conveyor means is slowed down and enables a guillotine blade to cut of the florets. This movement and the collection of the cut-off florets falling down by gravity on a lower level, increases the machines loss ratio of such processes.

Another previously developed process features a clamping portion that can be opened and closed and transports vegetable around the plane of the loop. When the clamping portion is in its closed position and the stalks are affixed in its holding portion, a rotary saw cuts off the stalks. However, this approach does not provide for a proper and complete removal of the cores according to the peculiar form of stems and florets, thus resulting in high amounts of scrap as well.

Several further approaches have been developed to slice broccoli heads into spears. A device using this approach divides the heads into multiple segments by a segmenting knife and, then, separates the florets by use of a spinning, semispherical cutter. To sever the florets, such a cutter sweeps through approximately ninety degrees. Alternatively, the broccoli can be transported while laying on its side. A clamping jaw grasps the stems end of a broccoli, straightens them up and a slicing means that is mounted in a vertically aligned relation for joint rotational movement separates the florets. The slicing means provides a plurality of straight knife blades angularly related to each other for providing a plurality of longitudinal slices, severing the broccoli head in spears. The drawback to these methods is that they are instable and don't provide for accurate cuts, again leading to high amounts of scrap and ultimately higher processing costs.

Therefore it is desirable to provide a faster and more efficient methods of floreting broccoli.

BRIEF SUMMARY

Systems, apparatus and methods for floreting broccoli heads are provided. In certain embodiments, systems, methods and apparatus include a receiving cup coupled with a positioning and cutting assembly. Broccoli heads are placed individually, with the stem down or horizontal, in a receiving cup in a loading position. A gripping mechanism engages the stem portion to secure the head in place. The assembly adjusts the position of the receiving cup to a cutting position with the head down and stem up and rotates the receiving cup. A cutting mechanism includes a blade that engages the rotating head to cut the florets. The blade cuts off the florets which fall to a first location where they are collected in a first collecting bin or by a first collection conveyor. The assembly next adjusts the receiving cup to a releasing position, whereupon the clamping mechanism disengages to release the stem, which falls to a second location where it is collected on a second collecting conveyor or in a second collecting bin. The assembly then returns the receiving cup to the loading position.

Embodiments and aspects of the present invention are also applicable to cutting cauliflower heads.

In certain other embodiments, systems, methods and apparatus include a receiving cup coupled with a positioning and cutting assembly. Broccoli heads are placed individually, stem down, in a receiving cup in a loading position. A clamping mechanism engages the stem portion to secure the head in place. The assembly adjusts the position of the receiving cup to a cutting position with the head down and stem up and rotates the receiving cup. A cutting mechanism includes a blade that engages the rotating head to cut the florets. The blade cuts off the florets which fall to a first location where they are collected in a first collecting bin or by a first collection conveyor. The assembly next adjusts the receiving cup to a releasing position, whereupon the clamping mechanism disengages to release the stem, which falls to a second location where it is collected on a second collecting conveyor or in a second collecting bin. The assembly then returns the receiving cup to the loading position.

One embodiment of the present invention is the industrial fixed mounted application of the device wherein the apparatus is mounted in a fixed location and the broccoli heads are transported to the facility and processed in a production line. The apparatus is permanently affixed to a base or the floor of a production area.

Another embodiment of the invention is a mobile agricultural application where the apparatus can be installed on different types of tractors or other agricultural implements. An immediate handling and machining in the field is possible. Further, apparatus tolerances are developed to allow for some movement of the mobile platform base and/or a slow movement of the process throughout the field, much like the speed found in a combine or other farm implement machinery.

According to yet another aspect, an apparatus for processing a broccoli head is provided. The apparatus typically includes a support structure, and a head cutting and positioning assembly coupled with the support structure. The assembly typically includes a receiving cup for receiving a stem portion of a broccoli head when in a loading position, a gripping mechanism coupled to the receiving cup and configured to engage the stem portion of the broccoli head in the receiving cup to secure the broccoli head thereto, and an adjustment mechanism coupled to the receiving cup and configured to adjust positions of the receiving cup between the loading position, a cutting position and a releasing position. The assembly also typically includes a rotation mechanism configured to rotate the receiving cup, and a cutting mechanism including a blade configured to engage and cut a rotating broccoli head when in the cutting position. During typically operation, the rotation mechanism rotates the receiving cup at least when in the cutting position, the cutting mechanism cuts an unprocessed broccoli head held in the rotating receiving cup to form a broccoli floret portion and a broccoli stem portion, wherein the floret portion falls or drops to a first location, whereafter the adjustment mechanism adjusts the receiving cup to the releasing position, and whereafter the clamping mechanism releases the stem portion and the stem portion falls or drops to a second location different than the first location.

According to yet another aspect, a method for processing broccoli heads is provided. The method typically includes receiving a broccoli head in a receiving cup in a loading position, automatically gripping a stem portion of the broccoli head in the receiving cup so as to secure the broccoli head thereto, and automatically adjusting a position of the receiving cup to a cutting position. The method also typically includes automatically rotating the receiving cup at a rotation rate, such that the broccoli head rotates about an axis of the clamped stem portion, and automatically cutting the rotating broccoli head with a cutting blade when in the cutting position thereby creating a broccoli floret portion and a broccoli stem portion, wherein the broccoli floret portion falls to a first location and wherein the broccoli stem portion is held in the receiving cup. The method also typically includes automatically adjusting the position of the receiving cup to a releasing position, and automatically ungripping (or deactivating the gripping mechanism) the broccoli stem portion so that the broccoli stem portion is released and falls to a second location different than the first location.

According to yet another aspect, an apparatus for processing broccoli heads is provided. The apparatus typically includes a support structure, and a head cutting and positioning assembly coupled with the support structure. The assembly typically includes a plurality of receiving cups, each for receiving a stem portion of a broccoli head when in a loading position, a gripping mechanism coupled with each receiving cup and configured to engage the stem portion of the broccoli head in the receiving cup to secure the broccoli head thereto, and an adjustment mechanism coupled to each receiving cup and configured to adjust positions of the receiving cup between the loading position, a cutting position and a releasing position. The assembly also typically includes a rotation mechanism for each receiving cup that is configured to rotate the receiving cup, and a cutting mechanism for each receiving cup that includes a blade configured to engage and cut a rotating broccoli head when in the cutting position. During operation, for each receiving cup, the rotation mechanism rotates the receiving cup at least when in the cutting position, the cutting mechanism cuts an unprocessed broccoli head held in the rotating receiving cup to form a broccoli floret portion and a broccoli stem portion, wherein the floret portion falls or drops to a first location, whereafter the adjustment mechanism adjusts the receiving cup to the releasing position, and whereafter the clamping mechanism releases the stem portion and the stem portion falls or drops to a second location different than the first location.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1A:
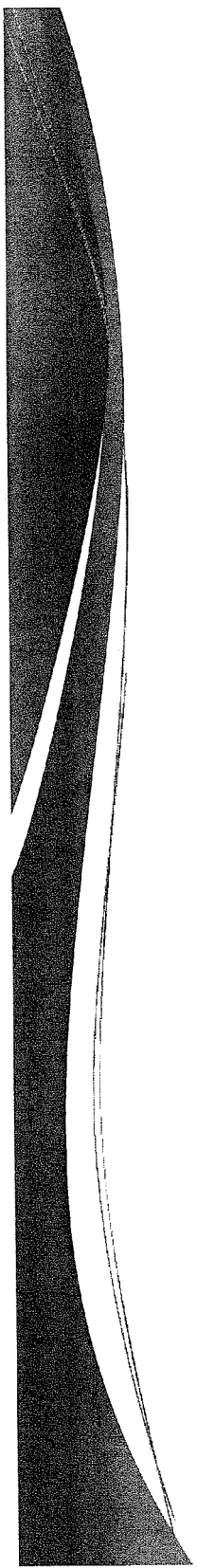
FIG. 1 illustrates an apparatus for processing broccoli florets according to one embodiment.
Figure 1A:
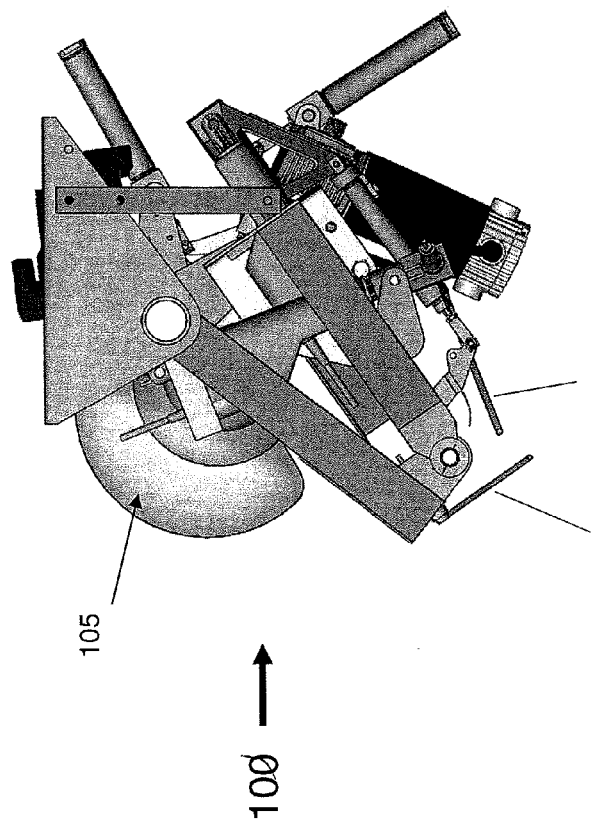

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The embodiments herein introduce improved methods and apparatus for use in floreting broccoli heads. Broccoli heads are individually placed in cups wherein the stems penetrate a hole in the cup. In one embodiment, the head is placed and securely held in the cup which is then repositioned to a cutting position and rotated while a blade engages the rotating head to produce florets which drop to a first location. After cutting, the cup is repositioned to a release position where the stem is released to a second location.

Figure 1B:
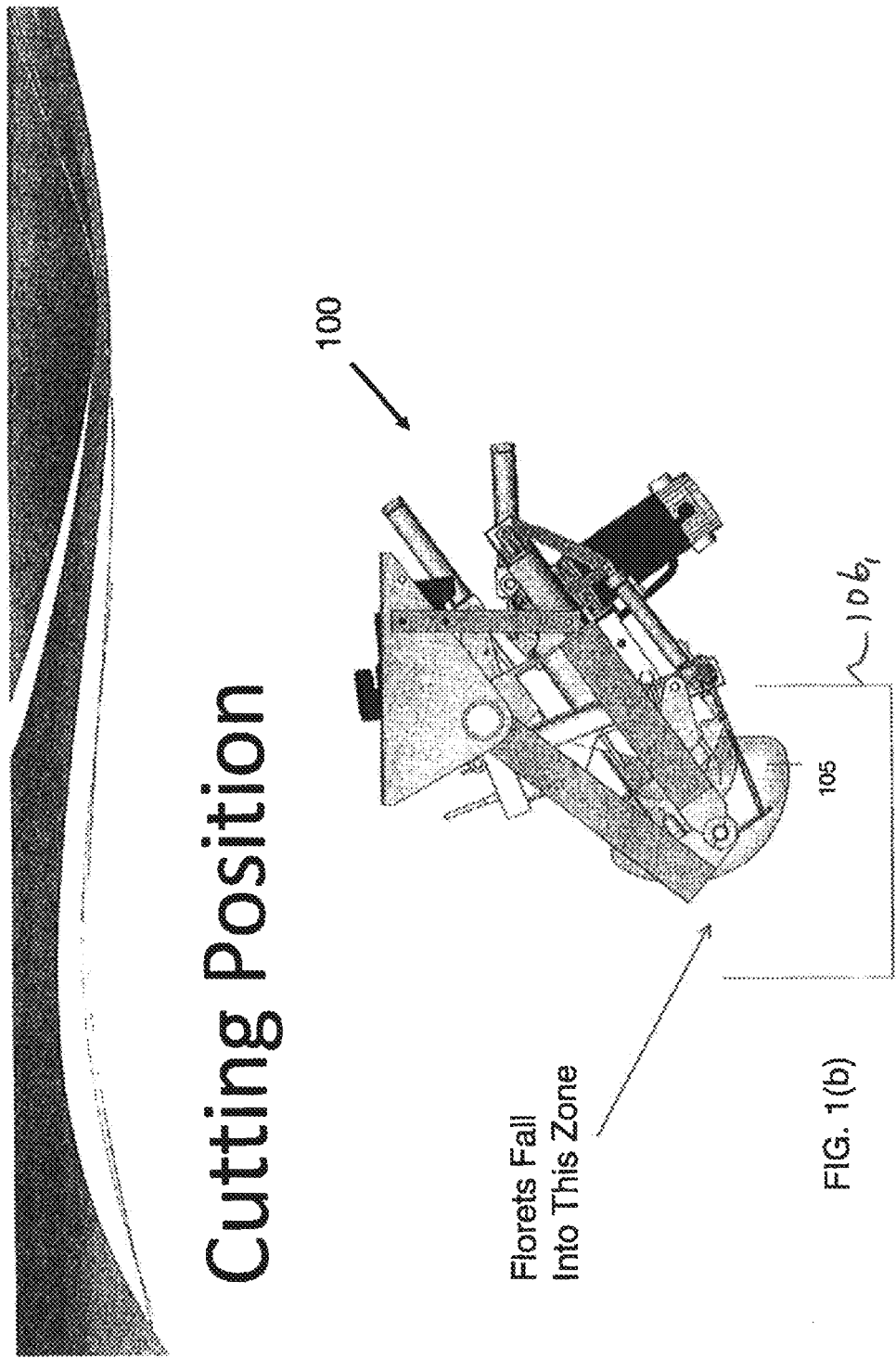
Figure 1C:
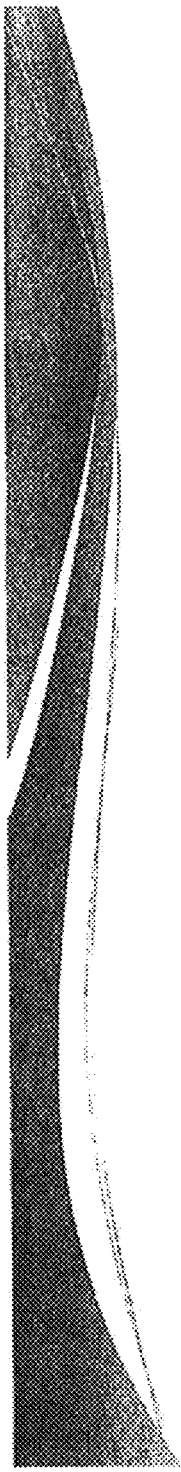
Figure 1C:
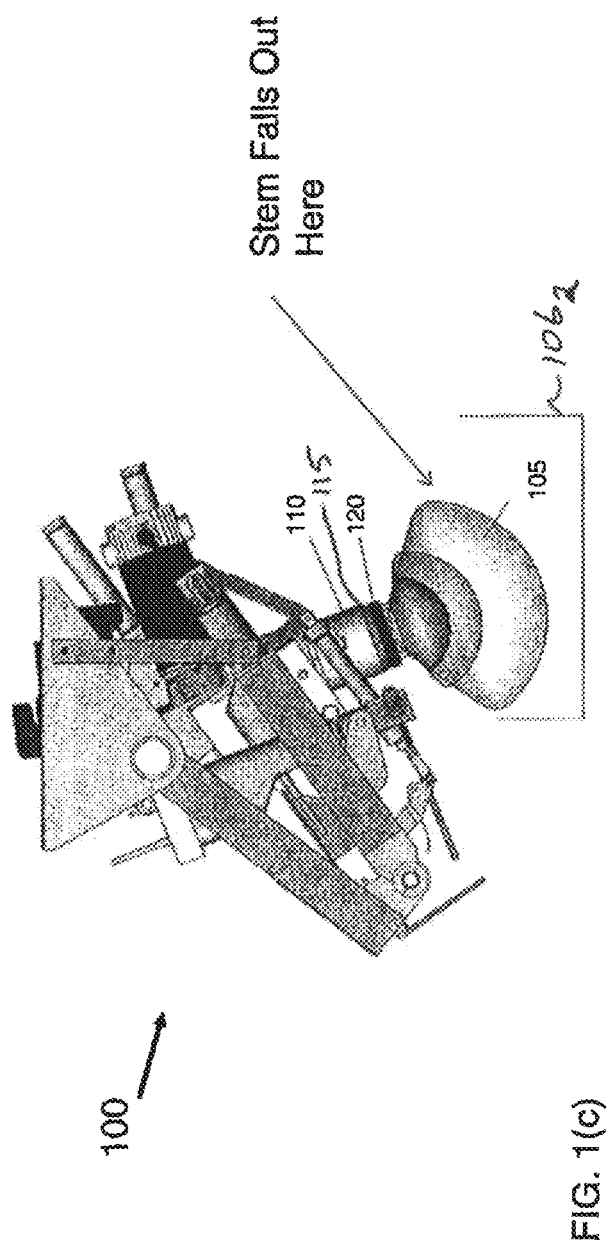
Figure 5:
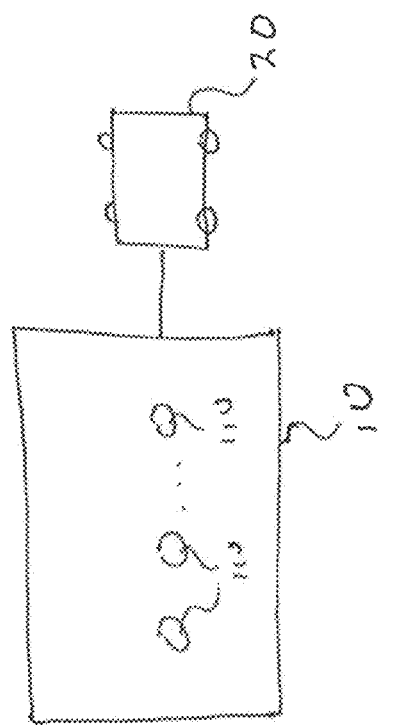
FIG. 5 illustrates an example of a support structure coupled with a tractor trailer and including a plurality of receiving cups.

FIG. 1 illustrates an apparatus including a positioning and cutting assembly 100 for processing broccoli florets according to one embodiment. FIG. 1a illustrates assembly 100 with a receiving cup 110 in a first, loading and securing position;

FIG. 1b illustrates assembly 100 in a second, cutting position, and FIG. 1c illustrates the assembly 100 in a third, releasing position. The cutting and positioning assembly 100 includes a receiving cup or chuck 110 for receiving a broccoli head 105, stem first, and a gripping mechanism for securing the head to the receiving cup. In one embodiment, the gripping mechanism 115 includes a bladder 120 within the receiving cup, the bladder being in fluid communication with a pump mechanism (340, FIG. 3). Upon activation, the pump mechanism fills the bladder with air or other gas such that a stem inserted into the receiving cup is engaged by the pressure/frictional force of the filled bladder. A rotation mechanism (330, FIG. 3) to rotate the receiving cup, and a cutting mechanism, including a blade for engaging the head when in the cutting position, are also provided for cutting a held broccoli head as will be described in more detail below. The assembly 100 also includes various pneumatic elements and mechanical connectors configured to adjust the position of the receiving cup, and hence a held broccoli head, to the different positions. Adjustment includes rotation of the cup 110 around an adjustment axis. As shown in FIG. 1a, for example, when in the loading position, a worker is able to load a broccoli head, stem first, into a receiving cup 110. When in the cutting position as shown in FIG. 1b, florets cut by the cutting mechanism fall or drop to a first location, e.g., collection bin or conveyor $106_1$. When in the releasing or dumping position as shown in FIG. 1c, a released stem portion falls or drops to a second location, e.g., collection bin or conveyor $106_2$, different than the first location. Operation of assembly 100 will be described in connection with a process embodiment shown in FIG. 2. FIG. 5 shows an example of a support structure 10 coupled with a tractor trailer 20 and including a plurality of receiving cups 110 as described in more detail herein.

Figure 2:
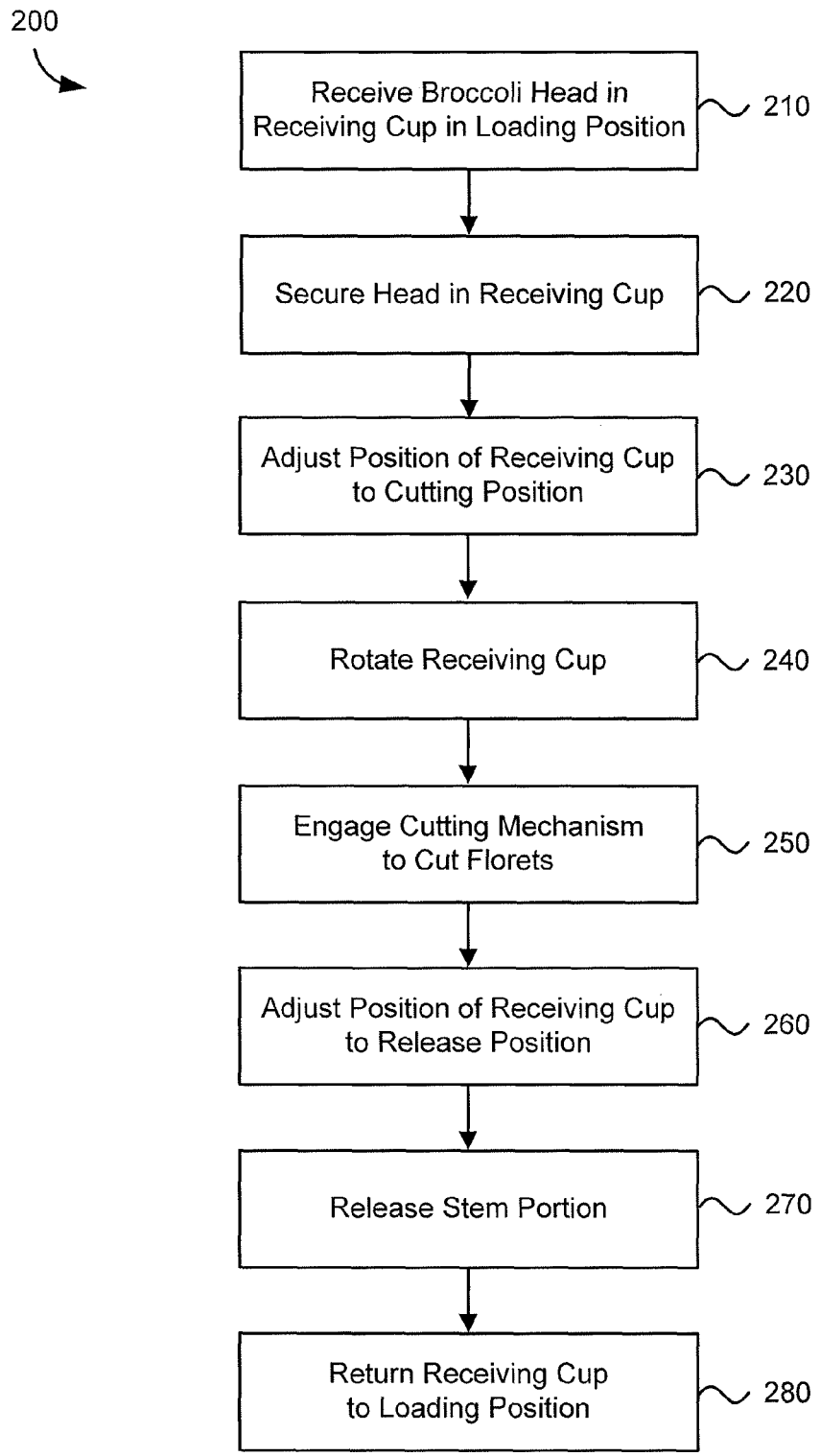
FIG. 2 illustrates a method of floreting broccoli using an apparatus of FIG. 1 according to one embodiment.

FIG. 2 illustrates a method 200 of processing a broccoli head to produce floret portions and a stem portion using an assembly 100 of FIG. 1 according to one embodiment. Harvested broccoli is first cut into unprocessed head elements 105 and then placed in the receiving cups 110 by a field worker; hence, in step 210, a broccoli head is received in receiving cup 110 when receiving cup 110 is in the loading position as shown in FIG. 1a. The loading position may be configured such that the stem portion points downward (e.g., at an angle between 0 degrees (horizontal) and vertical (90 degrees)) or lays horizontal. In step 220, the broccoli head is secured in the receiving cup. The gripping mechanism engages either automatically or in response to a user activated control signal. For example, after inserting the stem in the receiving cup, a user may press a button which activates the gripping mechanism to engage the stem and secure the broccoli head in the receiving cup. In certain aspects, the gripping mechanism includes a bladder 120 within the receiving cup portion. A pump mechanism, when activated, pumps air into the bladder to thereby inflate the bladder and engage the stem by pressure/frictional force.

In step 230, the receiving cup is repositioned to a cutting position as shown in FIG. 1b. In certain aspects, step 230 is performed automatically after the broccoli head has been secured in step 220. It should be understood that step 230 may be initiated automatically or in response to a separate user control signal. In step 240, rotation of receiving cup 110 is initiated. For example, the rotation mechanism rotates or spins receiving cup 110 at a rate of up to about 180 rpm or more. Rotation may be initiated before or after receiving cup 110 is repositioned to the cutting position. In step 250, the cutting mechanism is engaged. In one embodiment, a blade is inserted into the rotating head to sever florets from the stem portion. In one embodiment, the position and orientation of the cutting blade with respect to the rotating broccoli head is determined based on one or more broccoli head sensors (not shown in FIG. 1) as will be discussed in more detail below. Upon being cut, broccoli florets fall or drop to a first location below the assembly. In one embodiment, a collection bin is positioned at the first location. In another embodiment, a portion of a collection conveyor is located at the first location, whereby florets dropped onto the conveyor at the first location are transported to another location by the conveyor.

In step 260, the receiving cup is repositioned to a release position as shown in FIG. 1c. In certain aspects, step 260 is performed automatically after cutting has completed, e.g., after the cutting blade has been inserted and retracted from the rotating broccoli head. It should be understood that step 260 may be initiated automatically or in response to a separate user control signal. In step 270, the stem portion is released from receiving cup 110; the gripping mechanism disengages the stem to allow the stem to fall by way of gravity. For example, in embodiments using a pump and bladder mechanism, air is released or allowed to escape from the bladder thereby removing the pressure/frictional force acting by the bladder on the stem. Upon being released, the broccoli stem falls or drops to a second location below the assembly. In one embodiment, a collection bin is positioned at the second location. In another embodiment, a portion of a second collection conveyor is located at the second location, whereby stems dropped onto the second conveyor at the second location are transported to another location by the conveyor. In step 280, the receiving cup is adjusted back to the receiving or loading position to allow for another broccoli head to be received and processed.

Sensors

In certain embodiments, one or more sensors are used to determine size characteristics of a head held in a receiving cup. This information is used to adjust the position and/or orientation of a cutting blade and thereby optimize the floret sizes cut from a broccoli head.

FIG. 3 illustrates an embodiment incorporating a sensor that measures the position of the top of a head held in a receiving cup. In certain aspects, an optical sensor is used, for example a break-beam photo sensor or other optical sensor. In certain aspects, a mechanical sensor is used, such as a bar coupled with a biasing mechanism which provides feedback based on the angle at which the bar contacts the head. As shown in FIG. 3, a sensor 310 detects the position of the top of a head held in receiving cup 110. A cutting mechanism includes a cutting blade 320; the position and orientation of the blade is adjusted based on the sensor feedback from sensor 310. For example, for a large head size as shown in FIG. 3a, the blade is positioned as shown (the blade engages the rotating head by activation of the cutting mechanism which may include linearly sliding the blade 320 into the rotating head and/or sliding the blade into the head in an arced path). Similarly, for a small head the cutting mechanism is positioned as shown in FIG. 3b, and for a medium head, the cutting mechanism is positioned as shown in FIG. 3c. It should be appreciated that multiple activations of the cutting mechanism may occur. For example, for a large head, as determined by the sensor 310 (FIG. 3a), the cutting mechanism activates to engage the blade with the head as shown in FIG. 3a producing a first set of florets, then the sensor is adjusted and detects a smaller head portion (e.g., FIG. 3b or 3c) thereby activating the blade at a lower position to cut additional florets.

In certain aspects, the cutting mechanism is mechanically coupled with the sensor 310, e.g., as the sensor moves downward or upwards, so too does the cutting mechanism and blade. The orientation of the blade may also adjust as the cutting mechanism raises or lowers. In certain aspects, the cutting mechanism is electrically coupled with the sensor, e.g., as the sensor moves downward or upwards, a control signal is provided to the cutting mechanism to adjust the cutting mechanism and blade accordingly. An integrated processor or intelligence module (not shown) such as an ASIC may be used to process signals from the sensor 310 and generate signals for controlling the cutting mechanism and other components.

FIG. 4 illustrates an embodiment incorporating a sensor that measures the width or diameter of a head held in a receiving cup. In certain aspects, an optical sensor is used, for example a break-beam photo sensor or other optical sensor. In certain aspects, a mechanical sensor is used, such as a bar coupled with a biasing mechanism which provides feedback based on the angle at which the bar contacts the head. As shown in FIG. 4, a sensor 410 detects the position of the widest part a head held in receiving cup 110. The position and orientation of the cutting blade is adjusted based on the sensor feedback from sensor 410. For example, for a large diameter head size as shown in FIG. 4a, the blade may be positioned or oriented than for medium diameter head (FIG. 4b) or a small diameter head (FIG. 4c). In certain aspects, the cutting mechanism is mechanically coupled with the sensor 410, e.g., as the sensor moves inwards or outwards, so too does the cutting mechanism and blade. The orientation of the blade may also adjust as the cutting mechanism adjusts. In certain aspects, the cutting mechanism is electrically coupled with the sensor 410, e.g., as the sensor moves inwards or outwards, a control signal is provided to the cutting mechanism to adjust the cutting mechanism and blade accordingly. The integrated processor or intelligence module may be used to process signals from the sensor 410 and generate signals for controlling the cutting mechanism and other components. In one embodiment, both the head length sensor 310 and the head width sensor 410 are simultaneously active, providing feedback information for adjusting the cutting mechanism accordingly to produce florets having controlled size characteristics. For example, in certain aspects, the cutting assembly is controlled to produce florets having a substantially constant (e.g., within about 10% to 20% consistency in length and width) floret size.

Figure 3A:
FIG. 3 illustrates an embodiment incorporating a sensor that measures the position of the top of a head held in a receiving cup.
Figure 3A:
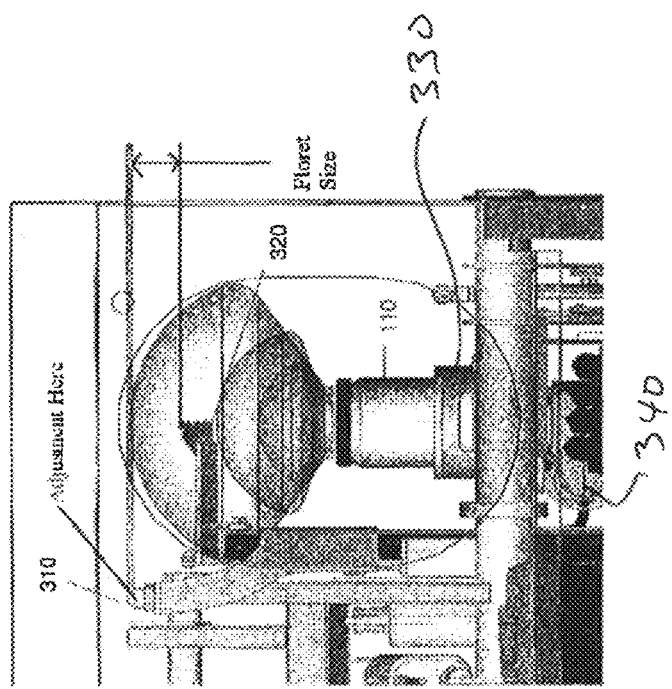
Figure 3B:
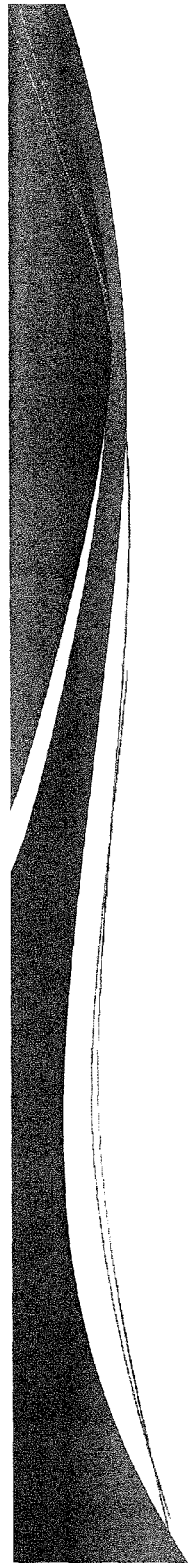
Figure 3B:
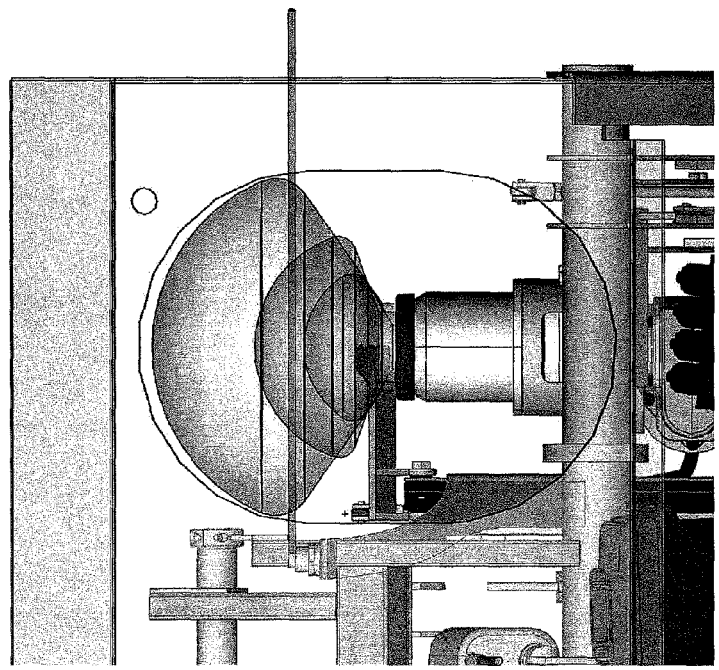
Figure 3C:
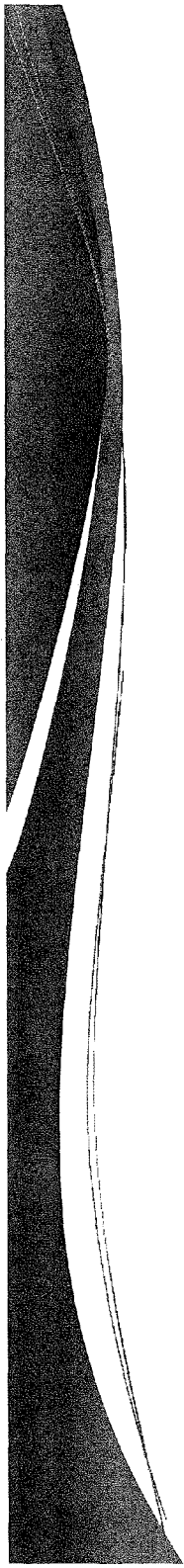
Figure 3C:
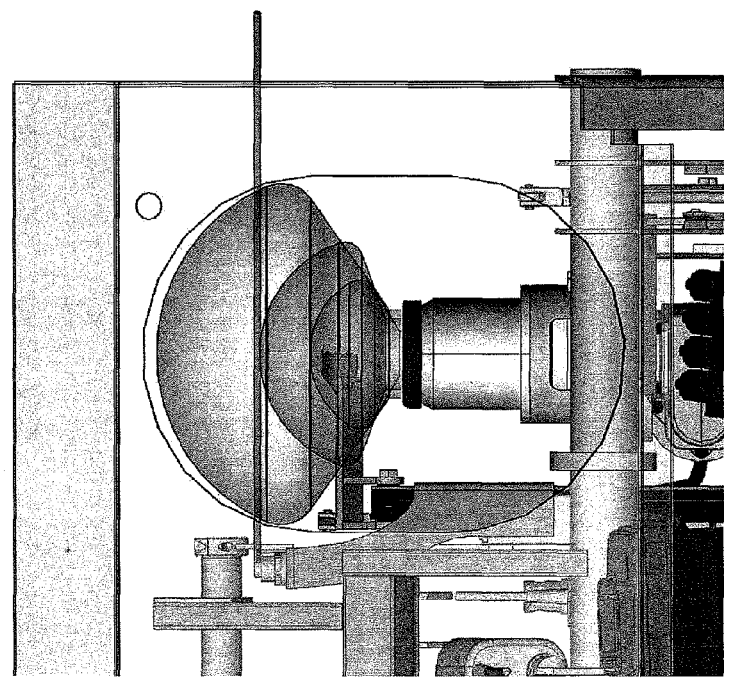
Figure 4A:
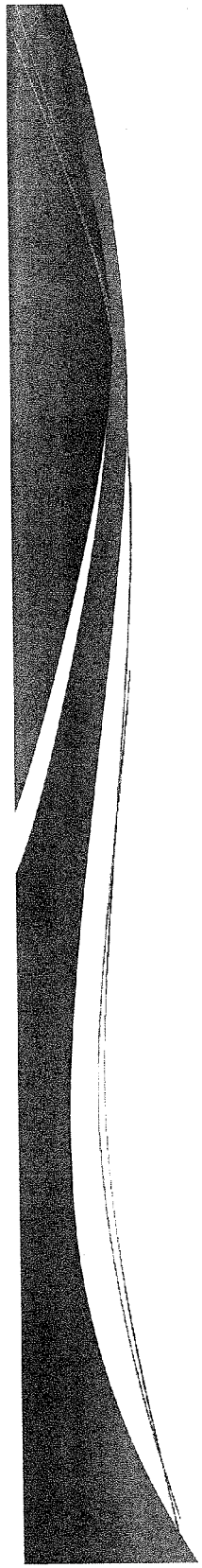
FIG. 4 illustrates an embodiment incorporating a sensor that measures the width or diameter of a head held in a receiving cup.
Figure 4A:
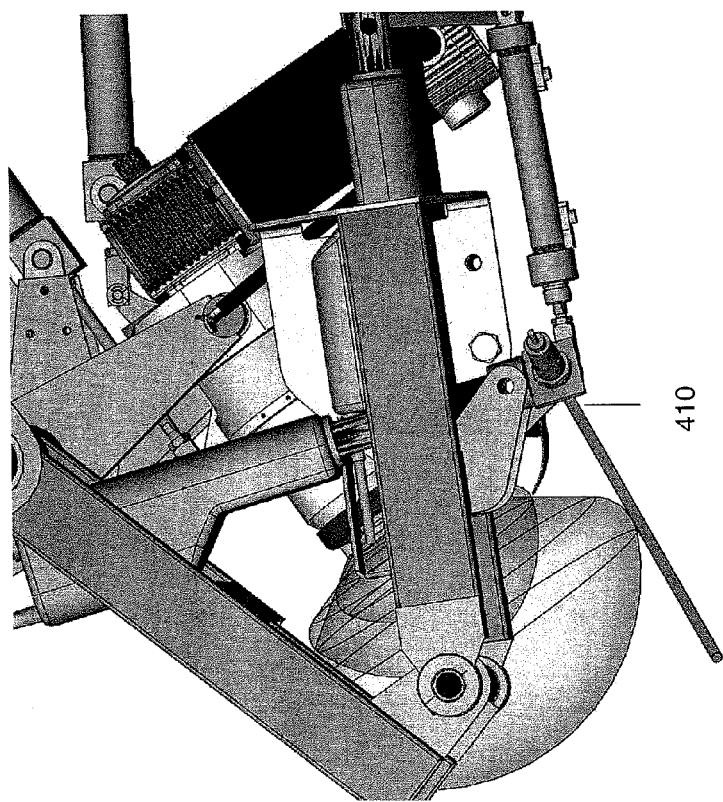
Figure 4B:
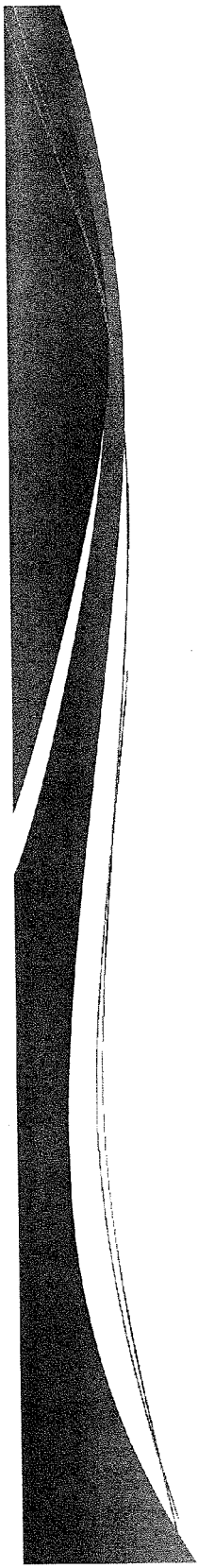
Figure 4B:
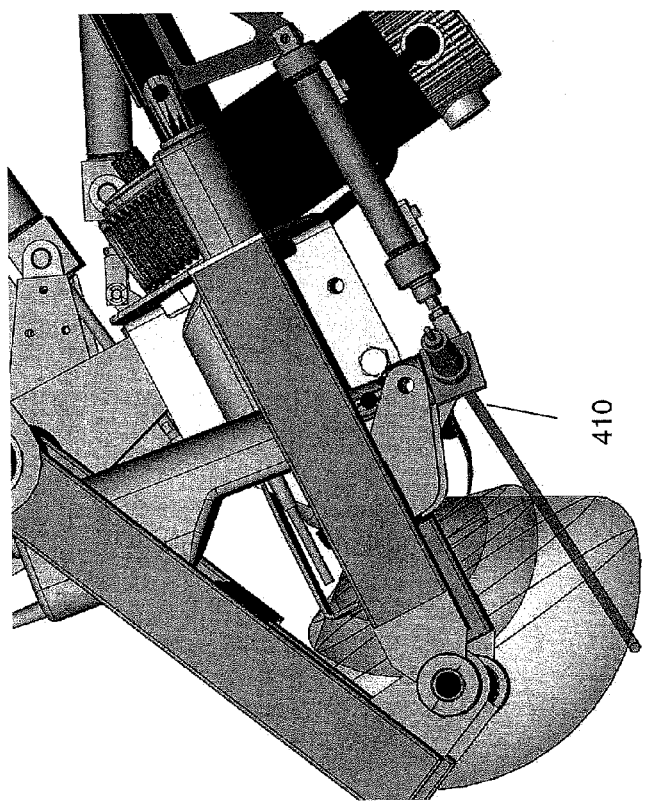
Figure 4C:
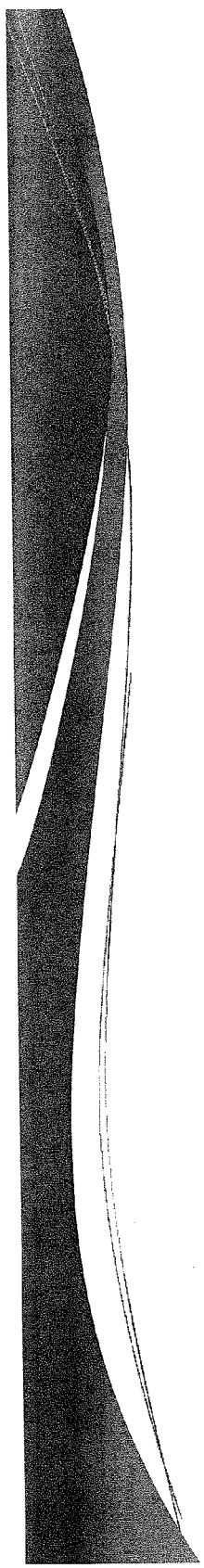
Figure 4C:
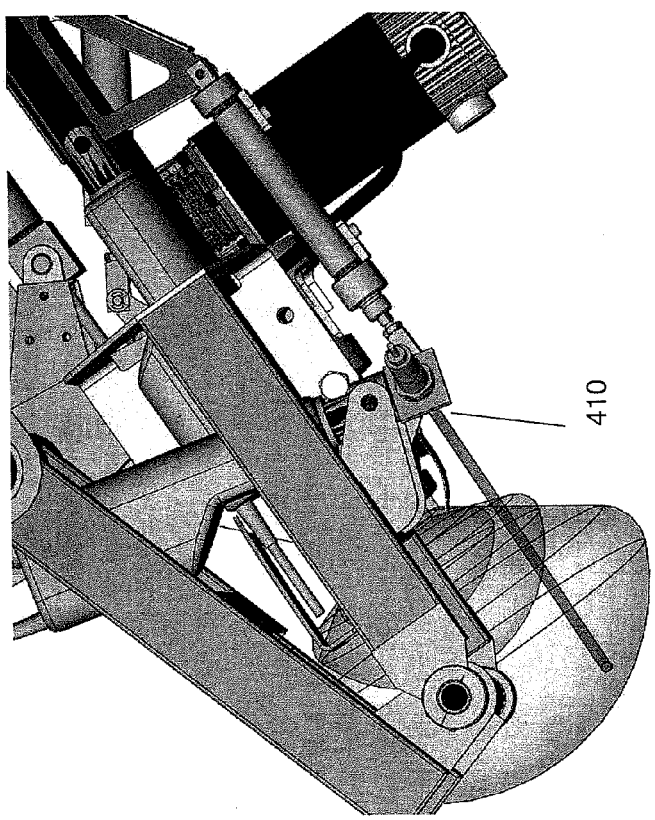

In certain embodiments, blade 320 is swept pneumatically towards the spin axis of the receiving cup and head, and the blade is oriented so as to cut substantially parallel to the spin axis, e.g., as shown in FIG. 3a. In other embodiments, the blade orientation is configured with an angle to the spin axis. In certain aspects, the blade assembly starts to move in a linear fashion until the "end of head" position is detected. At that point, when the sensor has seen the end of head, the blade sweeps along a circular or rotary path. Upon completing this "sweep" of the blade, the blade end of travel is detected, and linear motion is resumed. This second linear move is to gain mechanical clearance to avoid any collisions as the gripping device is moved to the "releasing" position, and then returned to the "loading" position.

U.S. patent application Ser. No. 12/033,791 is hereby incorporated by reference for all purposes.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. For example, embodiments and aspects of the present invention are useful for cutting cauliflower heads or other vegetables. For cauliflower heads, in certain embodiments, one or more blades that create a "V" cut to remove the core from the florets may be desirable. Accordingly, it is appropriate that the appended claims be construed broadly and in a manner consistent with the scope of the invention, as set forth in the following claims.

What is claimed is:

1. An apparatus for processing a broccoli head, comprising:
   a support structure;
   a head cutting and positioning assembly coupled with the support structure, the assembly including:
      a receiving cup for receiving a stem portion of a broccoli head when in a loading position;
      a gripping mechanism coupled to the receiving cup and configured to engage the stem portion of the broccoli head in the receiving cup to secure the broccoli head thereto;
      an adjustment mechanism coupled to the receiving cup and configured to adjust positions of the receiving cup between the loading position, a cutting position and a releasing position;
      a rotation mechanism configured to rotate the receiving cup 360 degrees about an axis of the engaged stem portion, thereby causing the broccoli head to rotate 360 degrees about the axis;
      a cutting mechanism including a blade configured to engage and cut a rotating broccoli head when the receiving cup is in the cutting position and while the receiving cup rotates the broccoli head about the axis of the engaged stem portion;
   wherein, during operation, the rotation mechanism continuously rotates the receiving cup 360 degrees about the axis at least when in the cutting position, the cutting mechanism cuts an unprocessed broccoli head held in the rotating receiving cup while the receiving cup continuously rotates the broccoli head about the axis to form a broccoli floret portion and a broccoli stem portion, wherein the floret portion falls or drops to a first location, whereafter the adjustment mechanism adjusts the receiving cup to the releasing position, and whereafter the gripping mechanism releases the stem portion and the stem portion fills or drops to a second location different than the first location.

2. The apparatus of claim 1, wherein the gripping mechanism includes a pump, and a bladder positioned inside the receiving cup, wherein upon activation the pump fills the bladder to thereby engage and secure the stem within the receiving cup.

3. The apparatus of claim 2, wherein the cutting mechanism includes a blade configured to cut a clamped broccoli head while the clamped head is rotating with the receiving cup.

4. The apparatus of claim 1, wherein the receiving cup is configured to receive a broccoli head with the stem pointing in a downward direction when in the loading position.

5. The apparatus of claim 4, wherein the stem points in a first upward direction relative to the floret portion when in the cutting position, and wherein the stem points in a second upward direction different than the first upward direction when in the releasing position.

6. The apparatus of claim 1, wherein the assembly further includes at least one sensor for determining one of a width of a head held in the receiving cup or a length of a head held in the receiving cup.

7. The apparatus of claim 1, wherein the assembly further includes a first sensor for determining a width of a head held in the receiving cup, and a second sensor for determining a length of the head held in the receiving cup.

8. The apparatus of claim 1, further comprising:
one of a first bin or a first collecting conveyor located at the first location and one of a second bin or second collection conveyor located at the second location.

9. The apparatus of claim 1, wherein the support structure is coupled with a trailor.

10. The apparatus of claim 1, wherein the assembly further includes;
at least one sensor for determining one of a width of a head held in the receiving cup or a length of a head held in the receiving cup; and
an intelligence module adapted to process a feedback signal received from the at least one sensor and to generate a blade control signal to control the cutting mechanism to adjust a position and/or an orientation of the blade.

11. The apparatus of claim 1, wherein the assembly further includes:
a first sensor for determining a width of a head held in the receiving cup;
a second sensor for determining a length of the head held in the receiving cup; and
an intelligence module adapted to process feedback signals received from both the first sensor and the second sensor, and to generate a blade control signal to control the cutting mechanism to adjust a position and/or an orientation of the blade.

12. An apparatus for processing broccoli heads, comprising:
a support structure;
a head cutting and positioning assembly coupled with the support structure, the assembly including:
a plurality of receiving cups, each for receiving a stem portion of a broccoli head when in a loading position;
a gripping mechanism coupled with each receiving cup and configured to engage the stem portion of the broccoli head in the receiving cup to secure the broccoli head thereto;
an adjustment mechanism coupled to each receiving cup and configured to adjust positions of the receiving cup between the loading position, a cutting position and a releasing position;
a rotation mechanism for each receiving cup that is configured to rotate the receiving cup 360 degrees about an axis of the engaged stem portion, thereby causing the broccoli head to rotate 360 degrees about the axis;
a cutting mechanism for each receiving cup that includes a blade configured to engage and cut a rotating broccoli head when the receiving cup is in the cutting position and while the receiving cup rotates the broccoli head about the axis of the engaged stem portion;
wherein for each receiving cup, during operation, the rotation mechanism continuously rotates the receiving cup 360 degrees about the axis at least when in the cutting position, the cutting mechanism cuts an unprocessed broccoli head held in the rotating receiving cup while the receiving cup continuously rotates the broccoli head about the axis of the engaged stem portion to form a broccoli floret portion and a broccoli stem portion, wherein the floret portion falls or drops to a first location, whereafter the adjustment mechanism adjusts the receiving cup to the releasing position, and whereafter the gripping mechanism releases the stem portion and the stem portion falls or drops to a second location different than the first location.

13. The apparatus of claim 12, wherein the assembly further includes, for each receiving cup, at least one sensor for determining one of a width of a head held in the receiving cup or a length of a head held in the receiving cup.

14. The apparatus of claim 13, wherein the assembly further includes:
an intelligence module adapted to process feedback signals received from the sensors and to generate blade control signals to control the cutting mechanisms to adjust a position and/or an orientation of the blades.

15. The apparatus of claim 12, wherein each gripping mechanism includes a pump, and a bladder positioned inside the receiving cup, wherein upon activation the pump fills the bladder to thereby engage and secure the stem within the receiving cup.

16. The apparatus of claim 12, wherein the support structure is coupled with a trailor.

* * * * *